Nov. 6, 1923. 1,473,399

R. E. CHOATE

WHEEL

Filed May 12, 1922

Inventor
Roy E. Choate
By J. M. St. John,
Atty.

Patented Nov. 6, 1923.

1,473,399

UNITED STATES PATENT OFFICE.

ROY E. CHOATE, OF CEDAR RAPIDS, IOWA.

WHEEL.

Application filed May 12, 1922. Serial No. 560,465.

*To all whom it may concern:*

Be it known that I, ROY E. CHOATE, a citizen of the United States, residing at Cedar Rapids, in the county of Linn and State of Iowa, have invented certain new and useful Improvements in Wheels; and I do hereby declare the following to be a full, clear, and exact description of the invention, such as will enable others skilled in the art to which it appertains to make and use the same.

This invention relates to vehicle wheels, but more especially to such as must bear heavy loads, such as the wheels of heavy-duty dump-wagons, house-moving trucks, and the like.

The object of the invention is to produce a wheel possessing the maximum of strength in proportion to weight, and of simple and economical construction.

Figure 1:
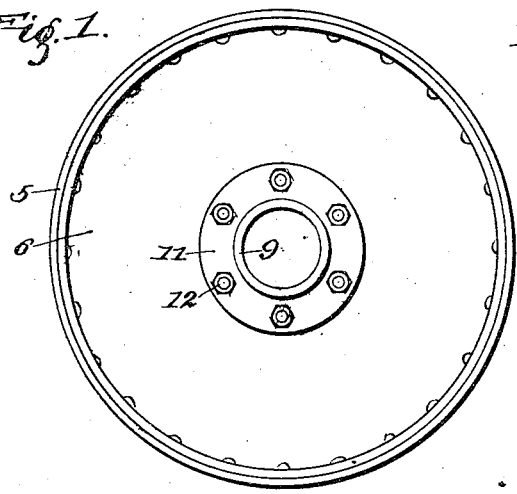
Figure 2:
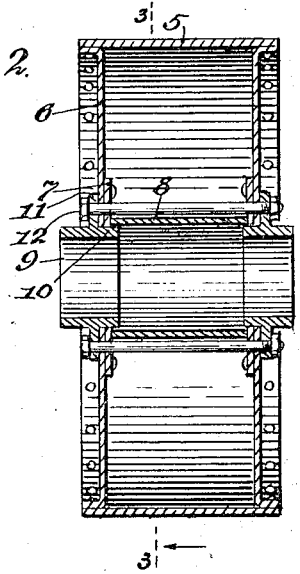
Figure 3:
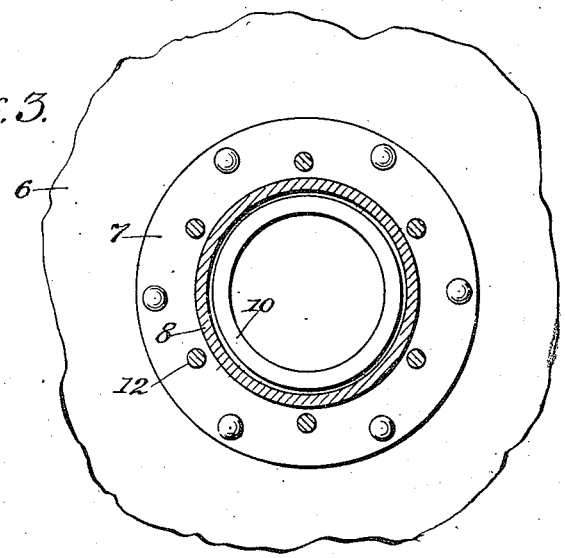

The invention is fully disclosed in the description and claims following, reference being had to the accompanying drawing, in which:

Fig. 1 is a side elevation of a wheel embodying my invention; Fig. 2 is a central, transverse section of the same; Fig. 3 is a fragmentary section on the line 3—3 of Fig. 2.

The wheel is in the nature of a drum, the wheel, aside from the hub, being composed of a broad, flat tread-ring or cylinder 5, near the edges of which are riveted two flanged disks 6 fitting neatly therein. The disks have central holes to receive the hubs, and for extra strength and hub-support are reinforced by annular rings 7, riveted to the disks, and bored to correspond therewith. Between the annular rings is set a spacing-tube 8, a little larger than the bore of the disks, and serving to hold the disks rigidly in position against the inward pressure of the hub-bolts. In each disk is set a hub member 9, whose inwardly extending portion 10 fits nicely in the bore of the disk and reinforcing ring and into the ends of the spacing-tube. An annular flange 11 bears against the flat outer face of each disk, and through both hubs, disks and annular rings, outside the spacing tube, pass bolts 12 to bind the parts securely together.

This construction, which is illustrated in Figs. 2 and 3 is adapted to produce the maximum of rigidity in the wheel, especially the disks thereof, since the interposed spacing-tube serves as an abutment member to truss the side disks, and the hub-bolts bind all the parts rigidly together. The hub construction is also more especially designed for use with an interlining sleeve, not shown, to serve as the outer raceway for roller bearings, a sleeve of drawn tubing being better adapted for that purpose than a bored hub of cast material.

Having thus described my invention, I claim:

1. A wheel, composed of a cylindrical tread-rim, flanged, internal disks riveted thereto, and bored centrally, an interposed abutment member, flanged hub-members projecting through the disks and into the abutment members, and bolts passing through the hub flanges and the disks, to bind the parts together.

2. A wheel, composed of a cylindrical tread-rim, flanged, internal disks riveted thereto and bored centrally, centrally disposed reinforcing rings correspondingly bored, an interposed abutment member, flanged hub members projecting through the reinforced disks and into the abutment member, and bolts passing through them and the disks and reinforcing rings, to bind them all together.

In testimony whereof I affix my signature in presence of two witnesses.

ROY E. CHOATE.

Witnesses:
 H. C. AHRENS,
 JOHN KAPLAN.